United States Patent
Zhang et al.

(10) Patent No.: US 12,162,735 B2
(45) Date of Patent: Dec. 10, 2024

(54) AUTOMATIC LEVELING CONTROL METHOD FOR A FOUR-LEG SUPPORT WORKING PLATFORM

(71) Applicant: Shandong University of Technology, Zibo (CN)

(72) Inventors: Fan Zhang, Zibo (CN); Jixing Wu, Zibo (CN); Wentao Yang, Zibo (CN); Huiheng Wang, Zibo (CN); Zhenhua Wu, Zibo (CN); Lijun Li, Zibo (CN); Xianyue Gang, Zibo (CN)

( * ) Notice: Subject to any disclaimer, the term of this patent is extended or adjusted under 35 U.S.C. 154(b) by 449 days.

(21) Appl. No.: 17/476,052

(22) Filed: Sep. 15, 2021

(65) Prior Publication Data

US 2022/0378191 A1 Dec. 1, 2022

(51) Int. Cl.
*B66F 7/06* (2006.01)
*B60S 9/02* (2006.01)
*B65G 69/24* (2006.01)

(52) U.S. Cl.
CPC .................. *B66F 7/06* (2013.01); *B60S 9/02* (2013.01); *B65G 69/24* (2013.01); *B65G 2203/0225* (2013.01); *B65G 2811/0626* (2013.01); *B65G 2814/0344* (2013.01)

(58) Field of Classification Search
CPC ... B66F 7/06; B60S 9/02; B65G 69/24; B65G 2203/0225; B65G 2811/0626; B65G 2814/0344
See application file for complete search history.

(56) References Cited

FOREIGN PATENT DOCUMENTS

CN   102303570 A  * 1/2012  ............. B66C 23/78
CN   102529907 B  * 12/2014

* cited by examiner

Primary Examiner — Khoi H Tran
Assistant Examiner — Bryant Tang
(74) Attorney, Agent, or Firm — Lei Jiang; Lei Jiang W LC

(57) ABSTRACT

The present disclosure discloses an automatic leveling control method for a four-leg support working platform, which comprises the steps: determining the mass center position of the working platform, determining the main bearing quadrant and distinguishing active legs from the driven leg; adjusting the driven leg to weak state, controlling all legs to synchronously actuate for leveling; calculating the limit compensating actuation length of the driven leg, and performing compensating actuation until accomplishing the leveling process. The method is advantageous in: high speed, high robustness, no repeated oscillation. The mass center always stays within the bearing zone of the active legs, thus completely eliminating capsizing risk of the working platform. The compensating actuation of the driven leg ensures there is no weak leg, and hence high attitude and load-bearing stability of the working platform is achieved.

3 Claims, 4 Drawing Sheets

AUTOMATIC LEVELING CONTROL METHOD FOR A FOUR-LEG SUPPORT WORKING PLATFORM

CROSS-REFERENCE TO RELATED APPLICATIONS

The subject application claims priority of the Chinese invention application 2021106090622 filed on Jun. 1, 2021 in China. The contents and subject matter thereof are incorporated herein by reference.

FIELD OF INVENTION

The present disclosure relates to the field of attitude control and specifically relates to an automatic leveling control method for a four-leg support working platform.

BACKGROUND ART

For improvement of working stability of upload for special working vehicles with leveling control requirements, such as autocranes, concrete pump trucks, and high-altitude rescue vehicles, four outstretched legs are commonly used to support the vehicle until the tires are completely off the ground, for subsequent upload operation. At present, the automatic leveling control technology has not yet been introduced in civilian special working vehicles with leveling control requirements, but only roughly leveled by manually controlling the lifting of the legs. The leveling process is time-consuming and laborious, the working platform oscillates repeatedly, loads of the legs are not effectively controlled, even weak leg and overloading may occur. Capsizing accidents caused by the poor leveling control effect take place frequently.

The Chinese patent CN201110170018.2 discloses a method and system for extending and leveling the legs of engineering vehicles, in which the legs are first extended until contacting the ground, empirically judging whether the legs are stable, then check the right-left and forward-backward angles of the vehicle chassis compared with the horizontal plane and repeatedly conducting the leveling. The Chinese patent CN201110095913.2 discloses an automatic leveling control method and control system. The method is to control the extension speed of the legs by repeatedly detecting the inclination angles between two predetermined coordinate axes and the target plane, thereby achieving the leveling control. The WIPO patent WO2019021123A1 discloses an automatic leveling system for an operating machine. The method is to repeatedly measure the inclination angles between the operating machine and the reference element by an electronic measuring device, and generating the inclination angle signal. The processing unit receives the inclination angle signal and sends out a command signal to control the expansion and contraction of the legs by the thrust elements for leveling. The afore-mentioned patents all have the defects as repeated oscillation of the working platform, time-consuming, poor robustness, bad control of the leg load, even weak leg and occurrence of overloading.

The leveling control of a four-leg support working platform is a statically indeterminate problem, whose solution is typical of uncertainty and multiplicity. The core of the prior art leveling control method is the point chasing method and the inclination angle method, and inevitably requires repeated measurement and control, thus resulting in the problems of repeated oscillation of the working platform, time-consuming, poor robustness, bad control of leg load, and even weak leg and overloading. Prior art technologies are helpless in satisfactorily solving the above problems.

SUMMARY OF THE INVENTION

In view of the afore-mentioned problem, the present disclosure provides an automatic leveling control method for a four-leg support working platform, which firstly reduces the four-point support leveling problem to a three-point support leveling control problem, then realizes four-point stable support by means of compensating actuation of the weak leg, thus solving the problems of prior art leveling control method in repeated oscillation, time-consuming, poor robustness, bad control of the leg load, even weak leg and occurrence of overloading.

The four-leg support working platform employed by the automatic leveling control method for the four-leg support working platform of the present invention are as follows: the upper end of each leg is connected with a lower horizontal surface of the four-leg support working platform, the lower end of each leg is supported on ground, each leg has an identical structure and an identical maximum actuating stroke and is identically connected to the four-leg support working platform at a corresponding connection point, a force sensor for measuring vertical load is installed between each leg and the four-leg support working platform. The automatic leveling control method for the four-leg support working platform of the present invention comprises the following steps:

Step 1, driving one leg to contract to be detached completely off the ground, treating a vertical load residual on the leg as a measurement error and clearing the measurement error to zero in calculation, then driving the leg to extend to support on the ground, performing identical operations successively for the other three legs; driving the four legs to fully support the four-leg support working platform, and adjusting each leg to bear the vertical load, recording the vertical load as $F_i$, with i ranging from 1-4; establishing a coordinate system by taking the symmetry center of the fours connection points as a coordinate origin and longitudinal, transverse and vertical directions of the four-leg support working platform as an x, a y and a z axis respectively; denoting the coordinate of each connection point as $(x_i, y_i, z_i)$, denoting a total weight of the four-leg support working platform as G; obtaining, in accordance with the torque balance relationship of the four-leg support working platform along the x, along the y axes and a force balance relationship along the z axis respectively, and with positive directions of torques and inclination angles being determined in accordance with right hand screw rule, a longitudinal and a transverse coordinate of a mass center of the four-leg support working platform and the total weight of the four-leg support working platform respectively as:

$$\begin{cases} x_G = \frac{1}{G}\sum_{i=1}^{4} F_i x_i \\ y_G = \frac{1}{G}\sum_{i=1}^{4} F_i y_i \\ G = \sum_{i=1}^{4} F_i \end{cases}$$

Step 2, dividing the four-leg support working platform into 4 virtual rectangular blocks along the longitudinal and transverse directions and from the origin of the coordinate system, corresponding to four quadrants of an xy plane of the coordinate system described in step 1, defining the virtual rectangular block where the coordinate of the mass center is located as a main bearing quadrant; the main bearing quadrant being a first quadrant if the x and y coordinates of the mass center are both positive values; the main bearing quadrant being a second quadrant if the x and y coordinates of the mass center are negative and positive values respectively; the main bearing quadrant being a third quadrant if the x and y coordinates of the mass center are both negative values; the main bearing quadrant being a fourth quadrant if the x and y coordinates of the mass center are positive and negative values respectively; selecting any three legs from the 4 legs and forming a virtual triangular block from the corresponding three connection points; forming other three virtual triangular blocks from remaining selection of three legs from the 4 legs; selecting the virtual triangular block that fully covers the main bearing quadrant as a main bearing zone, and designating the three corresponding legs forming the corresponding virtual triangular block as active legs, and designating a remaining leg as a driven leg.

Step 3, driving the driven leg to extend a specified vertical displacement, then contract to an original length thereof, while keeping the legs other than the driven leg unactuated; measuring changes of the inclination angle of the four-leg support working platform around the x and they axes corresponding to extension of the driven leg to the specified vertical displacement; obtaining a vertical displacement actuation length of the driven leg under a unit inclination angle change by means of dividing the specified vertical displacement with a larger absolute quantity of the changes of the inclination angle of the four-leg support working platform around the x or they axes.

Step 4, controlling a contracting actuation of the driven leg until the vertical load thereof diminishes to zero, thus achieving a weak leg state.

Step 5, setting an inclination angle threshold $\varepsilon_\theta$ of the four-leg support working platform, measuring the inclination angles of the four-leg support working platform around the x and the y axes respectively, calculating absolute values of the two inclination angles respectively; proceeding to step 8 on condition that the absolute values of the two inclination angles are both smaller than the inclination angle threshold $\varepsilon_\theta$; otherwise proceeding to step 6.

Step 6, calculating an target actuation length for the leveling control for said each leg according to an expression $\beta x_1-\alpha y_1$, $\beta x_2-\alpha y_2$, $\beta x_3-\alpha y_3$, $\beta x_4-\alpha y_4$, wherein $\alpha$ and $\beta$ are the inclination angles of the four-leg support working platform around the x and y axes respectively in the current state; determining a proportional relationship of the target actuation lengths of the four legs, setting an actuation speed of said each leg according to the proportional relationship;

Step 7, measuring the implemented actuation length of each active legs; proceeding to step 8 if the implemented actuation length of the each active leg is greater than or equal to the respective target actuation length of said each active leg; controlling said each leg to actuate simultaneously and in accordance with the actuation speed; contracting the driven leg to the weak leg state if a measurable vertical load of the driven leg is detected by the force sensor; proceeding to step 7;

Step 8, measuring the inclination angles of the four-leg support working platform around the x and y axes respectively, calculating the absolute values of the two inclination angles respectively; proceeding to step 9 on condition that the absolute values of the two inclination angles are both smaller than the inclination angle threshold $\varepsilon_\theta$; otherwise proceeding to step 6.

Step 89, setting a limit inclination angle threshold $\varepsilon_\gamma$ of the four-leg support working platform, wherein the limit inclination angle threshold $\varepsilon_\gamma$ is larger than the inclination angle threshold $\varepsilon_\theta$; calculating a difference $\varepsilon_\gamma-\varepsilon_\theta$ between the limit inclination angle threshold with the inclination angle threshold, multiplying the difference by the vertical displacement actuation length of the driven leg under the unit inclination angle change described in step 3 to obtain a limit compensating actuation length $\varepsilon_z$ of the driven leg.

Step 10, controlling a compensating actuation of the driven leg, and measuring a compensating actuation length of the driven leg, while simultaneously measuring the inclination angles of the four-leg support working platform around the x and y axes; continually performing the compensating actuation of the driven leg on condition that the compensating actuation length is smaller than the limit compensating actuation length $\varepsilon_z$, and the absolute values of the inclination angles of the four-leg support working platform around the x and y axes are both smaller than the limit inclination angle threshold $\varepsilon_\gamma$; otherwise locking all legs and concluding the automatic leveling control method.

Further, the specified vertical displacement described in step 3 has a range of 1%-5% of the maximum actuating stroke of the leg.

Further, the inclination angle threshold $\varepsilon_\theta$ described in step 5 has a range of 0.04°-0.08°.

The technical idea of the invention is: in response to the statically indeterminate problem of the leveling control for the four-leg support working platform, firstly measuring and obtaining the mass center position of the four-leg support working platform and the upper load, employing the main bearing quadrant rule to distinguish the bearing relationship between the active legs and the driven leg. Secondly, adjusting the driven leg just to the weak state, and performing synchronous leveling according to the actuation lengths of the legs required for leveling, wherein the driven leg is controlled to be always in the right point of weak actuation state, thus achieving a precise leveling effect. Since the mass center is always in the bearing zone of three active legs, there is no capsizing risk in the leveling process. Even in a rare circumstance wherein the mass center happens to be at the edge of the main bearing zone and goes out the zone during the leveling process, capsizing would not take place, since the driven leg is always under control of the actuating operation, load-bearing would be provided immediately. Finally, performing compensating actuation of the driven leg to eliminate the weak leg, and achieving the stable four-leg support for the four-leg support working platform.

The present disclosure has the following beneficial effects:

1. The method can realize the automatic leveling for the four-leg support working platform without manual intervention and is fast. Applying it to special vehicles with leveling requirements such as autocranes can solve the current situation of manual leveling, and greatly improve the automation and working efficiency.

2. During the leveling process, the mass center of the four-leg support working platform and the upper load is in the main bearing zone, so that the leveling process has no repeated oscillation, and has high safety and high robustness. Even in a very special condition wherein the mass center happens to be at the edge of the main bearing zone and goes out the zone during the leveling process, capsizing would not take place, since the driven leg is always under control of the actuating operation, load-bearing would be provided immediately.

3. The compensating actuation of the driven leg ensures that there is no weak leg problem, and subsequent to leveling, the four-leg support working platform has high attitude and load-bearing stability. Since the four legs are borne reliably subsequent to leveling, it can effectively avoid the capsizing risk caused by changes in load and attitude of the upper load, thus significantly improve the working safety of the special vehicles.

EMBODIMENTS

For clearer understanding of the object, the technical solution and the advantages of the present disclosure, the present disclosure is further described in detail in combination with the attached drawings and embodiments hereunder. It is understood that the specific embodiments described herein are meant only to explain, not to limit, the present disclosure.

The automatic leveling control method for a four-leg support working platform of the present disclosure corrects the defects of prior art leveling methods in low speed, poor robustness, repeated oscillation in leveling process, bad control of the leg load, even weak leg and occurrence of overloading.

Figure 2:
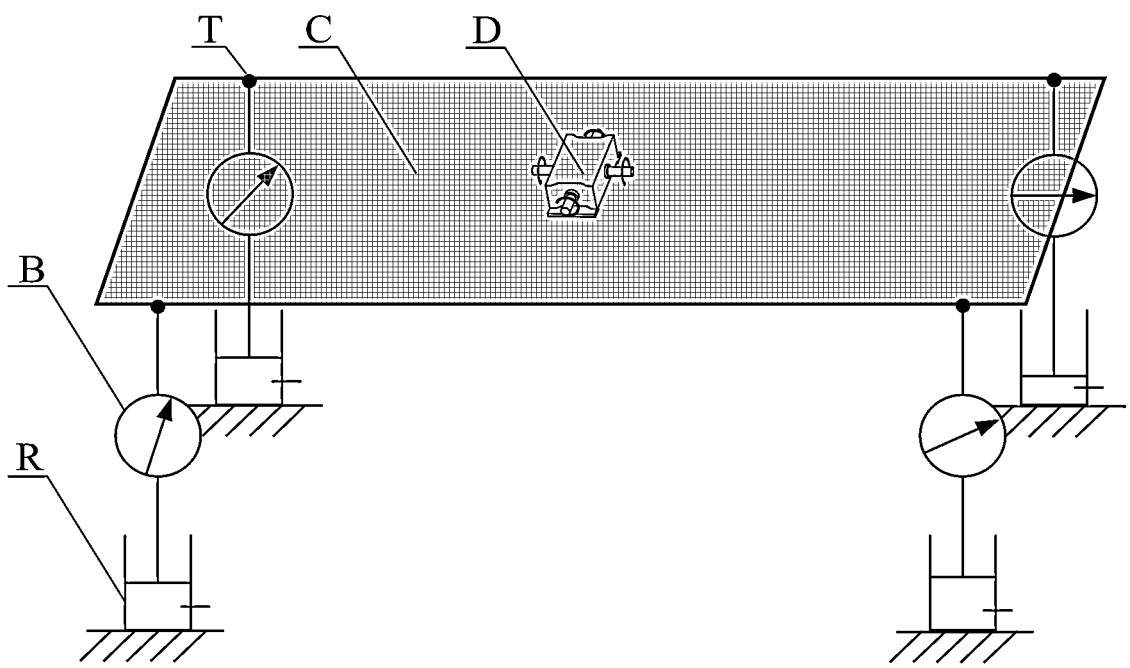
FIG. 2 is a schematic diagram showing the structural features of the four-leg support working platform of the automatic leveling control method of the present disclosure.
Figure 3:
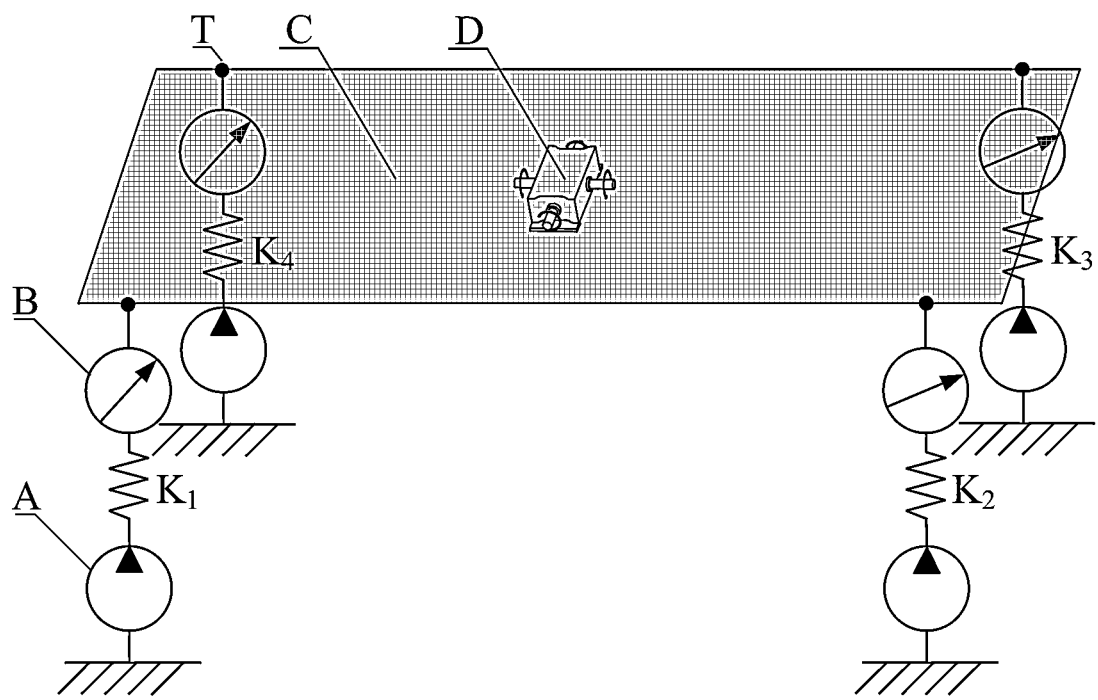
FIG. 3 is a schematic diagram of the four-leg support working platform with symbolic representation of the four legs of the automatic leveling control method of the present disclosure.

The automatic leveling control method for a four-leg support working platform of the present disclosure employs a four-leg support working platform as shown in FIG. 2, which comprises a four-leg support working platform C and four legs R with vertical lifting capacity. Each leg R has an identical structure and an identical maximum actuating stroke and is identically connected to the four-leg support working platform C at a respective connection point T. A force sensor B for measuring the vertical load is installed between the each leg R and the four-leg support working platform C. The four-leg support working platform C consists of four force sensors B, and all force sensors B are identical. One two-dimensional inclination angle sensor D is installed on the geometric center of the upper surface of the four-leg support working platform C. The total weight of the four-leg support working platform, including the gravity of the four-leg support working platform itself and the load of all the components there-above, is denoted as G. For concise description, FIG. 2, which shows the structural features of the four-leg support working platform, is simplified to the schematic diagram shown in FIG. 3. The four legs R, which must have certain elastic deformation, can each be regarded as equivalent to $K_1$, $K_2$, $K_3$ and $K_4$. The driving element of the leg R can be regarded as equivalent to the leg driver A, and the leg driver A has the capacity of measuring the vertical displacement of the actuation length of the leg R. The four-leg support working platform comprises four leg drivers A, and all leg drivers A are identical.

Figure 1:
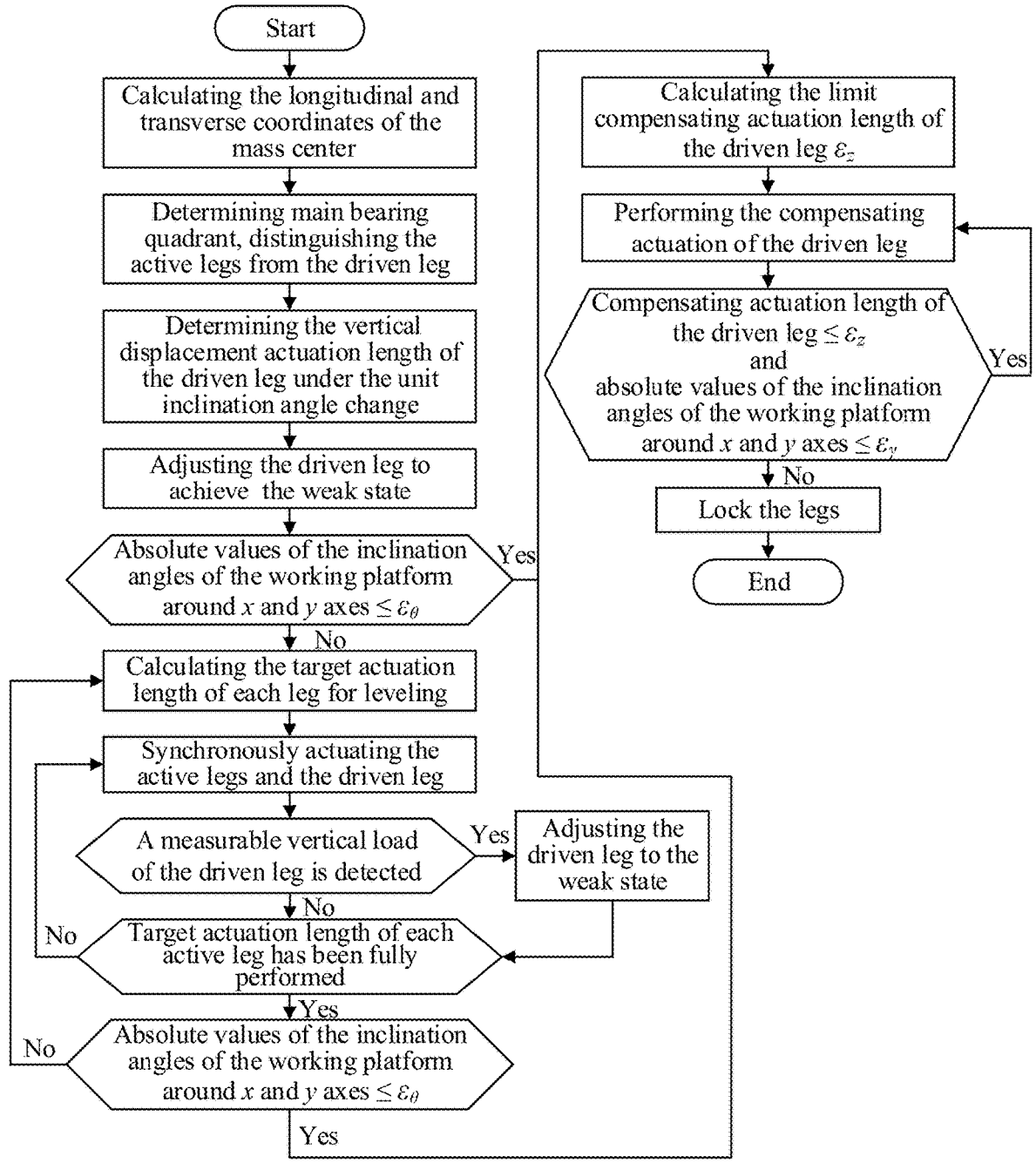
FIG. 1 is a flow chart of the automatic leveling control method for the four-leg support working platform of the present disclosure.

The present invention discloses an automatic leveling control method for a four-leg support working platform, whose control flow chart is shown in FIG. 1, and comprises the following steps:

Step 1, driving one leg R by its leg driver A to contract to be detached completely off the ground, measuring a vertical load residual on the leg R by the force sensor B and treating the vertical load residual on the leg R as a measurement error and clearing the measurement error to zero in calculation, then driving the leg R to extend to support on the ground. In order to prevent the four-leg support working platform C from capsizing when the leg R contracts to be detached completely off the ground, any solution such as employing a jack in a position near the contracted leg R as a substitute thereof, or employing a temporary brace to support the four-leg support working platform C, can be adopted to provide as protection. Performing identical operations successively for the other three legs R, thus realizing the zero clearing of the vertical load residual on each leg R; driving the four legs R by the leg drivers A to completely support the four-leg support working platform C, and adjusting each leg R to bear the vertical load, recording the vertical load by the force sensor B as $F_i$, wherein i ranges from 1-4. Establishing a coordinate system by taking the symmetry center of the connection points T as the coordinate origin and longitudinal, transverse and vertical directions of the four-leg support working platform C as the x, y and z axis respectively, denoting a coordinate of each connection point T as $(x_i, y_i, z_i)$, determining the positive directions of the torques and inclination angles in accordance with the right hand screw rule, denoting the total weight of the four-leg support working platform C as G, neglecting the weight of the each leg R, obtaining, in accordance with a torque balance relationship of the four-leg support working platform C along the x, along the y axes and a force balance relationship along the z axis respectively, the longitudinal and the transverse coordinate of the mass center of the four-leg support working platform C and the total weight of the four-leg support working platform C respectively as $$\begin{cases} x_G = \frac{1}{G}\sum_{i=1}^{4} F_i x_i \\ y_G = \frac{1}{G}\sum_{i=1}^{4} F_i y_i \\ G = \sum_{i=1}^{4} F_i \end{cases}$$

In the embodiment, subsequent to the adjusting each leg R to bear the vertical load, the minimum vertical load borne by each leg R should be larger than 5% of the total weight of the four-leg support working platform C.

Figure 4:
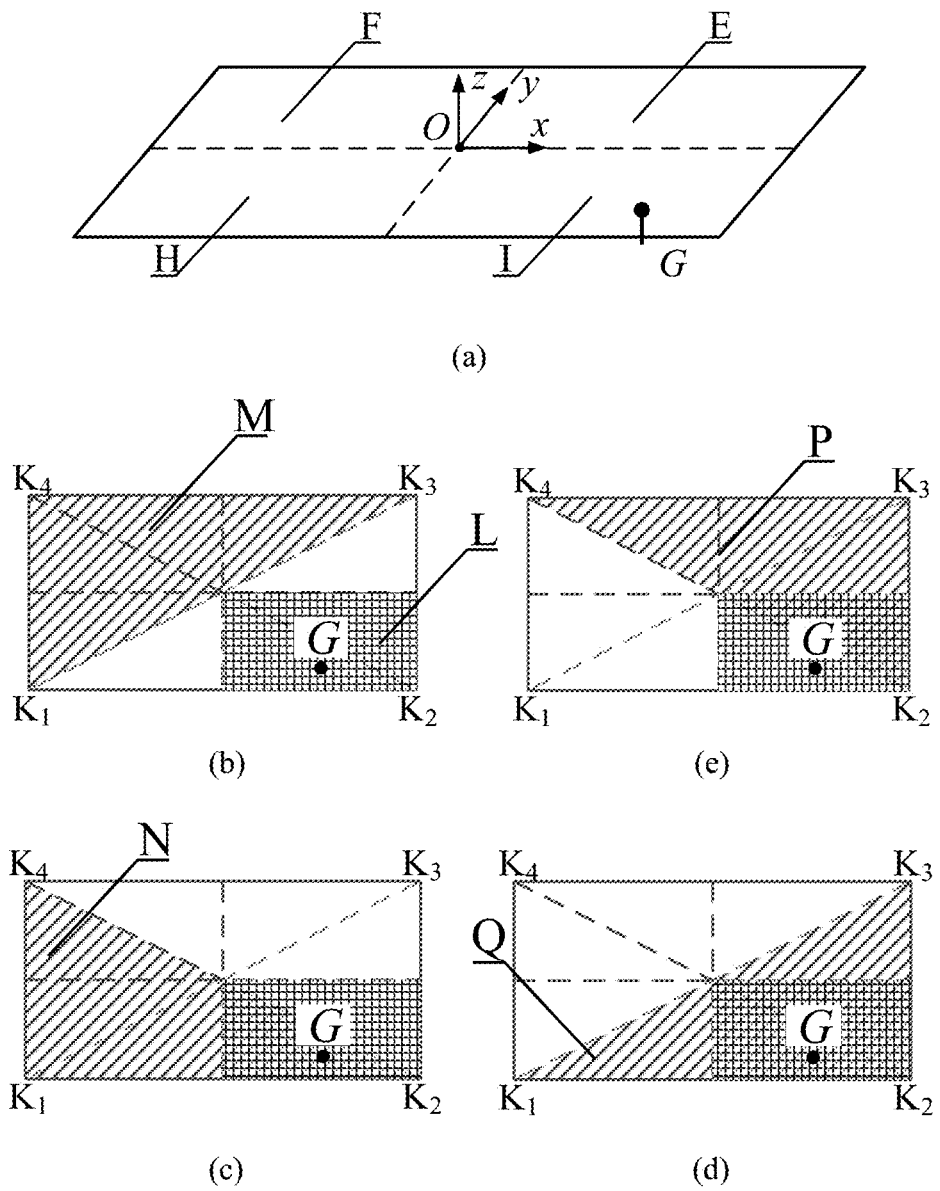
FIG. 4 is a schematic diagram depicting principle for determination of the main bearing quadrant and for division of the active legs and the driven leg of the four-leg support working platform of the automatic leveling control method for the present disclosure.

Step 2, as shown in FIG. 4, dividing the four-leg support working platform C into 4 virtual rectangular blocks along the longitudinal and transverse directions, and from the origin of the coordinate system O, corresponding to four quadrants of the xy plane of the coordinate system described in step 1, that is, the first quadrant E, the second quadrant F, the third quadrant H, the fourth quadrant I; defining the virtual rectangular block where the coordinates of the mass center locates as the main bearing quadrant L; selecting any three legs from the 4 legs R and forming a virtual triangular block from the corresponding three connection points T; forming other three virtual triangular blocks from the remaining selection of three legs from the 4 legs, and the four virtual triangular blocks are denoted as M, N, Q and P; determining the virtual triangular block that fully covers the main bearing quadrant L as the main bearing zone, determining the corresponding 3 legs as the active legs, and the remaining one leg as the driven leg.

In the embodiment, said defining the virtual rectangular block where the coordinate of the mass center is located as a main bearing quadrant L implies that: the main bearing quadrant L is the first quadrant E if the x and y coordinates of the mass center are both positive values; the main bearing quadrant L is a second quadrant F if the x and y coordinates of the mass center are negative and positive values respectively; the main bearing quadrant L is a third quadrant H if the x and y coordinates of the mass center are both negative values; the main bearing quadrant L is a fourth quadrant I if the x and y coordinates of the mass center are positive and negative values respectively.

In the embodiment, taking FIG. 4 as an example, the fourth quadrant I where the mass center of the four-leg support working platform C is located is defined as the main bearing quadrant L, and the virtual triangular block Q completely covers the main bearing quadrant L, that is, the main bearing zone, thus the corresponding three legs $K_1$, $K_2$, $K_3$ are the active legs, and the remaining leg $K_4$ is the driven leg.

Step 3, driving the driven leg to extend a specified vertical displacement measured by its leg driver A, then contract to the original length thereof, wherein keeping the legs R other than the driven leg unactuated, measuring changes of the inclination angle of the four-leg support working platform C around the x and y axes by the two-dimensional inclination angle sensor D as the driven leg extended to the specified vertical displacement; obtaining the vertical displacement actuation length of the driven leg under the unit inclination angle change by means of dividing the specified vertical displacement with a larger absolute quantity of the changes of the inclination angle of the four-leg support working platform C around the x or they axes.

In the embodiment, the specified vertical displacement has a range of 1%-5% of the maximum actuating stroke of the leg R.

Step 4, controlling a contracting actuation of the driven leg by the leg driver A until the vertical load thereof diminishes to zero, thus achieving a weak state.

Step 5, setting the inclination angle threshold $\varepsilon_\theta$ of the four-leg support working platform C, measuring the inclination angles of the four-leg support working platform C around the x and y axes respectively, calculating absolute values of the two inclination angles respectively; proceeding to step 8 on condition that the absolute values of the two inclination angles are both smaller than the inclination angle threshold $\varepsilon_\theta$; otherwise proceeding to step 6.

In the embodiment, the inclination angle threshold $\varepsilon_\theta$ has a range of 0.04°-0.08°.

Step 6, calculating an target actuation length for the leveling control for said each leg according to an expression $\beta x_1 - \alpha y_1$, $\beta x_2 \alpha y_2$, $\beta x_3 - \alpha y_3$, $\beta x_4 - \alpha y_4$, wherein a and $\beta$ are the inclination angles of the four-leg support working platform C around the x and y axes respectively in the current state; determining a proportional relationship of the target actuation lengths of the four legs R, setting an actuation speed of said each leg according to the proportional relationship.

Step 7, measuring the implemented actuation length of each active legs, proceeding to step 8 if the implemented actuation length of the each active leg is greater than or equal to the respective target actuation length of said each active leg; controlling said each leg to actuate simultaneously and in accordance with the actuation speed; contracting the driven leg to the weak leg state if a measurable vertical load of the driven leg is detected by the force sensor B; proceeding to step 7.

Step 8, measuring the inclination angles of the four-leg support working platform C around the x and y axes by the two-dimensional inclination angle sensor D respectively, calculating the absolute values of the two inclination angles respectively; proceeding to step 9 on condition that the absolute values of the two inclination angles are both smaller than the inclination angle threshold $\varepsilon_\theta$; otherwise proceeding to step 6.

Step 9, setting a limit inclination angle threshold $\varepsilon_\gamma$ of the four-leg support working platform C, wherein the limit inclination angle threshold $\varepsilon_\gamma$ is larger than the inclination angle threshold $\varepsilon_\theta$; calculating a difference $\varepsilon_\gamma - \varepsilon_\theta$ between the limit inclination angle threshold and the inclination angle threshold, multiplying the difference by the vertical displacement actuation length of the driven leg under the unit inclination angle change described in step 3 to obtain the limit compensating actuation length $\varepsilon_z$ of the driven leg.

In the embodiment, the limit inclination angle threshold $\varepsilon_\gamma$ has an application range of 0.6°-1°.

Step 10, controlling the compensating actuation of the driven leg by the leg driver A, and measuring the compensating actuation length of the driven leg, while simultaneously measuring the inclination angles of the four-leg support working platform C around the x and y axes; continually performing the compensating actuation of the driven leg on condition that the compensating actuation length is smaller than the limit compensating actuation length $\varepsilon_z$, and the absolute values of the inclination angles of the four-leg support working platform C around the x and y axes are both smaller than the limit inclination angle threshold $\varepsilon_\gamma$; otherwise locking all four legs and concluding automatic leveling control method.

Finally, it should be noted that the above descriptions are only preferred embodiments of the invention together with the underneath technical principles. A person skilled in the art understands that the invention is not limited to the particular embodiments described herein and that it is possible for a person skilled in the art to make any appreciable variation, readjustment or replacement without departing from the scope of protection of the invention. Therefore, although the present invention is described in more detail through the above embodiments, the present invention is not limited to the above embodiments, but may include many other equivalent embodiments without departing from the conception of the present invention, and the scope of the present invention is determined by the scope of the appended claims.

We claim:

1. An automatic leveling control method for a four-leg support working platform, with the four-leg support working platform comprising 4 legs, an upper end of each leg being connected with a lower horizontal surface of the four-leg support working platform, a lower end of each leg being supported on ground, each leg having an identical structure and an identical maximum actuating stroke and being identically connected to the four-leg support working platform at a respective connection point, a force sensor for measuring vertical load being installed between each leg and the four-leg support working platform, wherein the method comprises the following steps:

step 1, driving one of the 4 legs to contract to be detached completely off the ground, treating a vertical load residual on the leg as a measurement error and clearing the measurement error to zero in calculation, then driving the leg to extend to support on the ground, performing identical operations successively for the other three legs; driving the four legs to fully support the four-leg support working platform, and adjusting each leg to bear the vertical load, recording the vertical load as $F_i$, with i ranging from 1-4; establishing a coordinate system by taking a symmetry center of the connection points between each leg respectively and the four-leg support working platform as a coordinate origin and longitudinal, transverse and vertical directions of the four-leg support working platform as an x, a y and a z axis respectively; denoting a coordinate of each connection point as $(x_i, y_i, z_i)$, denoting a total weight of the four-leg support working platform as G; obtaining, in accordance with a torque balance relationship of the four-leg support working platform along the x, along the y axes and a force balance relationship along the z axis respectively, and with positive directions of torques and inclination angles being determined in accordance with right hand screw rule, a longitudinal and a transverse coordinate of a mass center of the four-leg support working platform and the total weight of the four-leg support working platform respectively as:

$$\begin{cases} x_G = \frac{1}{G}\sum_{i=1}^{4} F_i x_i \\ y_G = \frac{1}{G}\sum_{i=1}^{4} F_i y\ ; \\ G = \sum_{i=1}^{4} F_i \end{cases} \quad (1)$$

step 2, dividing the four-leg support working platform into 4 virtual rectangular blocks along the longitudinal and transverse directions and from the origin of the coordinate system, corresponding to four quadrants of an xy plane of the coordinate system described in step 1, defining the virtual rectangular block where the coordinates of the mass center is located as a main bearing quadrant; the main bearing quadrant being a first quadrant if the x and y coordinates of the mass center are both positive values; the main bearing quadrant being a second quadrant if the x and y coordinates of the mass center are negative and positive values respectively; the main bearing quadrant being a third quadrant if the x and y coordinates of the mass center are both negative values; the main bearing quadrant being a fourth quadrant if the x and y coordinates of the mass center are positive and negative values respectively; selecting any three legs from the 4 legs and forming a virtual triangular block from the corresponding three connection points; forming other three virtual triangular blocks from remaining selection of three legs from the 4 legs; selecting the virtual triangular block that fully covers the main bearing quadrant as a main bearing zone, and designating the three corresponding legs forming the corresponding virtual triangular block as active legs, and designating a remaining leg as a driven leg;

step 3, driving the driven leg to extend a specified vertical displacement, then contract to an original length thereof, while keeping the legs other than the driven leg unactuated; measuring changes of the inclination angle of the four-leg support working platform around the x and the y axes corresponding to extension of the driven leg to the specified vertical displacement; obtaining a vertical displacement actuation length of the driven leg under a unit inclination angle change by means of dividing the specified vertical displacement with a larger absolute quantity of the changes of the inclination angle of the four-leg support working platform around the x or they axes;

step 4, controlling a contracting actuation of the driven leg until the vertical load thereof diminishes to zero, this state when a leg bearing a zero vertical load is defined as a weak leg state;

step 5, setting an inclination angle threshold $\varepsilon_\theta$ of the four-leg support working platform, measuring the inclination angles of the four-leg support working platform around the x and the y axes respectively, calculating absolute values of the two inclination angles respectively; proceeding to step 8 on condition that the absolute values of the two inclination angles are both smaller than the inclination angle threshold $\varepsilon_\theta$; otherwise proceeding to step 6;

step 6, calculating an target actuation length for the leveling control for said each leg according to an expression $\beta x_1 - \alpha y_1$, $\beta x_2 - \alpha y_2$, $\beta x_3 - \alpha y_3$, $\beta x_4 - \alpha y_4$, wherein $\alpha$ and $\beta$ are the inclination angles of the four-leg support working platform around the x and y axes respectively in a current state; determining a proportional relationship of the target actuation lengths of the four legs, setting an actuation speed of said each leg according to the proportional relationship;

step 7, measuring the implemented actuation length of each active legs; proceeding to step 8 if the implemented actuation length of the each active leg is greater than or equal to the respective target actuation length of said each active leg; controlling said each leg to actuate simultaneously and in accordance with the actuation speed; contracting the driven leg to the weak leg state if a measurable vertical load of the driven leg is detected by the force sensor; proceeding to step 7;

step 8, measuring the inclination angles of the four-leg support working platform around the x and y axes respectively, calculating the absolute values of the two inclination angles respectively; proceeding to step 9 on condition that the absolute values of the two inclination angles are both smaller than the inclination angle threshold $\varepsilon_\theta$; otherwise proceeding to step 6;

step 9, setting a limit inclination angle threshold $\varepsilon_\gamma$ of the four-leg support working platform, wherein the limit inclination angle threshold $\varepsilon_\gamma$ is larger than the inclination angle threshold $\varepsilon_\theta$; calculating a difference $\varepsilon_\gamma - \varepsilon_\theta$ between the limit inclination angle threshold with the inclination angle threshold, multiplying the difference by the vertical displacement actuation length of the driven leg under the unit inclination angle change described in step 3 to obtain a limit compensating actuation length $\varepsilon_z$ of the driven leg;

step 10, controlling a compensating actuation of the driven leg, and measuring a compensating actuation length of the driven leg, while simultaneously measuring the inclination angles of the four-leg support working platform around the x and y axes; continually performing the compensating actuation of the driven leg on condition that the compensating actuation length is smaller than the limit compensating actuation length $\varepsilon_z$, and the absolute values of the inclination angles of the four-leg support working platform around the x and y axes are both smaller than the limit inclination angle threshold $\varepsilon_\gamma$; otherwise locking all four legs and concluding automatic leveling control method.

2. The automatic leveling control method for a four-leg support working platform of claim 1, wherein the specified vertical displacement described in step 3 has a range of 1%-5% of the maximum actuating stroke of the leg.

3. The automatic leveling control method for a four-leg support working platform of claim 1, wherein the inclination angle threshold $\varepsilon_\theta$ described in step 5 has a range of 0.04°-0.08°.

* * * * *